United States Patent [19]

De Vos et al.

[11] Patent Number: 5,346,928
[45] Date of Patent: Sep. 13, 1994

[54] RIGID POLYURETHANE FOAMS

[75] Inventors: Rik De Vos, Rotselaar; N. Washington Keane, Kraainem, both of Belgium

[73] Assignee: Imperial Chemical Industries PLC, London, England

[21] Appl. No.: 119,273

[22] Filed: Sep. 9, 1993

[51] Int. Cl.$^5$ .............................................. C08L 75/04
[52] U.S. Cl. ..................... 521/166; 521/117; 521/118; 521/123; 521/124; 521/125; 521/128; 521/131; 521/132; 521/172; 521/173
[58] Field of Search ............... 521/166, 117, 118, 123, 521/124, 125, 128, 131, 132, 166, 172, 173

[56] References Cited

U.S. PATENT DOCUMENTS 3,165,483  1/1985  Gemainhardt et al. ............... 260/2.5

FOREIGN PATENT DOCUMENTS 0188806  7/1986  European Pat. Off. .
0498628  8/1992  European Pat. Off. .
1461357  11/1966  France .

*Primary Examiner*—Maurice J. Welsh

[57] ABSTRACT

A process is provided for the preparation of rigid forms which comprises the step of reacting an organic polyisocyanate with an isocyanate-reactive material in the presence of a blowing promotor being an isocyanate-reactive cyclic compound of formula:

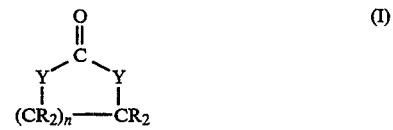

wherein
Y is O or $NR^1$ wherein each $R^1$ independently is a lower alkyl radical of $C_1$–$C_6$ or a lower alkyl radical substituted with an isocyanate-reactive group;
each R independently is hydrogen, a lower alkyl radical of $C_1$–$C_6$ or $(CH_2)_m$—X wherein X is an isocyanate-reactive group which is OH or $NH_2$ and m is 0, 1 or 2; and
n is 1 or 2;
with the proviso that at least one of $R^1$ or R is or comprises an isocyanate-reactive group;
and in the presence of an inert insoluble organic liquid which is present as the dispersed phase of an emulsion or a microemulsion and in the presence of a metal salt catalyst characterised in that the isocyanate-reactive material comprises a polyether polyol of average nominal functionality of 2 to 6 and a number average equivalent molecular weight between 1000 and 2000.

20 Claims, 2 Drawing Sheets

RIGID POLYURETHANE FOAMS

DESCRIPTION

This invention relates to rigid polyurethane foams and more especially to open celled rigid polyurethane foam and to methods for their preparation and to their use in evacuated insulation panels.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials.

Rigid polyurethane foams can be of the closed cell type or of the open cell type. An important application of open celled rigid polyurethane foam is as filler material in evacuated insulation panels as described in European Patent Publications Nos 188806 and 498628.

In European Patent Publication No. 498628 a process for preparing open celled rigid polyurethane foam is described, said process comprising the step of reacting an organic polyisocyanate with an isocyanate-reactive material in the presence of a blowing promotor being an isocyanate-reactive cyclic compound of formula:

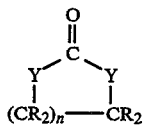
(I)

wherein
- Y is O or $NR^1$ wherein each $R^1$ independently is a lower alkyl radical of $C_1$–$C_6$ or a lower alkyl radical substituted with an isocyanate-reactive group;
- each R independently is hydrogen, a lower alkyl radical of $C_1$–$C_6$ or $(CH_2)_m$—X wherein X is an isocyanate-reactive group which is OH or $NH_2$ and m is 0, 1 or 2; and
- n is 1 or 2;
- with the proviso that at least one of $R^1$ or R is or comprises an isocyanate-reactive group;
- and in the presence of an inert insoluble organic liquid which is present as the dispersed phase of an emulsion or a microemulsion and in the presence of a metal salt catalyst.

By this process fine celled open celled rigid polyurethane foams are obtained with cell sizes in the range of 80 to 120 micron.

It is generally known that the smaller the cell size of the foam the better its performance in evacuated insulation panels in terms of the required vacuum degree to obtain a satisfactory insulation property and in terms of the ageing of the panel (i.e. the decrease in thermal insulation with lapse of time due to a decrease in the vacuum degree).

Therefore it is an object of the present invention to provide a process for preparing open celled rigid polyurethane foams with smaller cell sizes than the known ones.

Accordingly the present invention provides a process for the preparation of rigid foams comprising the step of reacting an organic polyisocyanate with an isocyanate-reactive material in the presence of a blowing promotor being an isocyanate-reactive cyclic compound of formula:

(I)

wherein
- Y is O or $NR^1$ wherein each $R^1$ independently is a lower alkyl radical of $C_1$–$C_6$ or a lower alkyl radical substituted with an isocyanate-reactive group;
- each R independently is hydrogen, a lower alkyl radical of $C_1$–$C_6$ or $(CH_2)_m$—X wherein X is an isocyanate-reactive group which is OH or $NH_2$ and m is 0, 1 or 2; and
- n is 1 or 2;
- with the proviso that at least one of $R^x$ or R is or comprises an isocyanate-reactive group;
- and in the presence of an inert insoluble organic liquid which is present as the dispersed phase of an emulsion or a microemulsion and in the presence of a metal salt catalyst characterised in that the isocyanate-reactive material comprises a polyether polyol of average nominal functionality 2 to 6 and number average equivalent molecular weight between 1000 and 2000.

Figure 1:
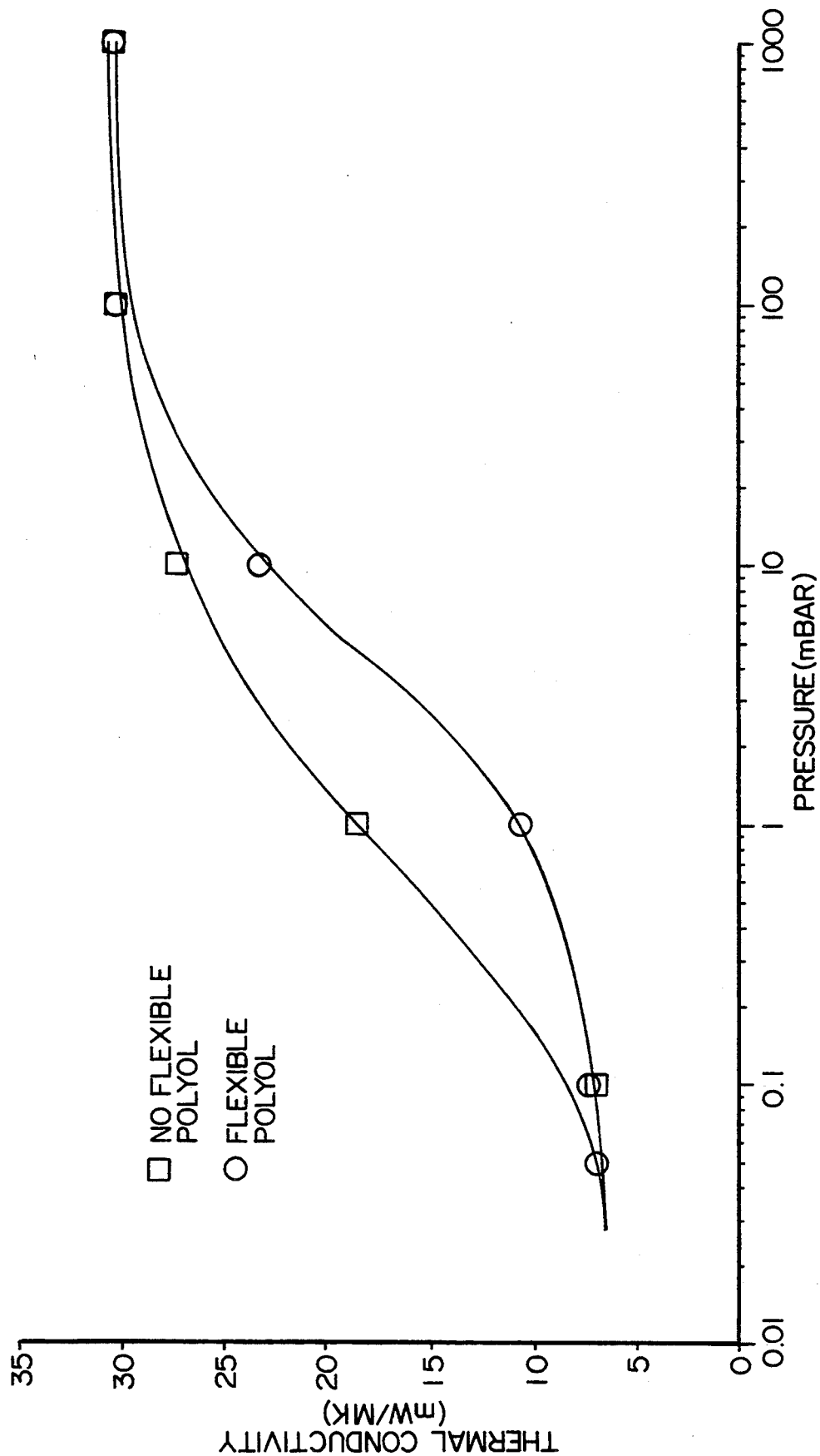
FIG. 1 shows the lambda versus pressure curve for foams prepared in Example 2.

By the process of the present invention fine celled open celled rigid polyurethane foams are obtained with cell sizes in the range 50 to 90 micron, Due to its finer cell sizes these foams perform better in evacuated insulation panels than the known open celled rigid foams.

The polyether polyol for use in the process of the present invention is a polyether polyol known in the art for the production of flexible polyurethane foams. Preferably this polyether polyol has a functionality of 2 to 4 and an OH value (in mg KOH/g) of between 20 and 80, preferably between 40 and 70, more preferably between 45 and 60 and most preferably between 50 and 55. It has an equivalent molecular weight of between 1000 and 2000 meaning that a bifunctional polyether polyol (functionality 2) has a molecular weight of between 2000 and 4000, a trifunctional (functionality 3) between 3000 and 6000, etc.

These polyether polyols are obtained by the polymerisation of a cyclic oxide, such as ethylene oxide and propylene oxide, in the presence of a polyfunctional initiator. Suitable initiators contain a plurality of active hydrogen atoms and include water and polyols, for example ethylene glycol, propylene glycol, diethylene glycol, dipropylene glycol, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10 to 80%, block copolymers having oxyethylene contents of up to 25%, and random/block copolymers having oxyethylene contents of up to 50%, based on the total weight of oxyalkylene units may be mentioned. Mixtures of the said diols and triols can be particularly useful. Preferred diols and triols are ethylene glycol, diethylene glycol, dipropylene glycol and glycerol.

The present polyether polyol known in the art for the production of flexible polyurethane foams is used in amounts ranging from 2 to 40% by weight based on the total isocyanate-reactive components. Generally this polyether polyol is added in such amounts that the compression strength of the rigid polyurethane foam does not decrease below 170 kPa and generally remains within the range 170 to 240 kPa.

A preferred compound of formula (I) wherein Y is O is an isocyanate-reactive cyclic carbonate which is glycerol carbonate.

Preferred compounds of formula (I) wherein Y is $NR^1$ are isocyanate-reactive cyclic ureas of formula:

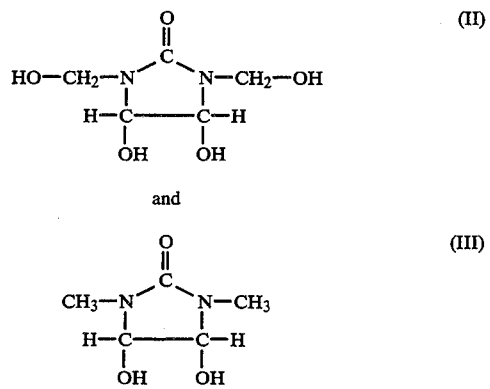

The isocyanate-reactive cyclic blowing promotor is used in amounts ranging from 1 to 99%, preferably from 1 to 60% by weight based on the total isocyanate-reactive material.

Suitable further blowing agents may be used in the method of the present invention such as water or inert low boiling compounds having a boiling point of above $-50°$ C. at 1 bar.

The amount of water used as blowing agent may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of water.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons and fluorine-containing ethers. Suitable hydrocarbon blowing agents include lower aliphatic or cyclic hydrocarbons such as n-pentane, isopentane, cyclopentane, neopentane, hexane and cyclohexane.

The insolubility of the inert organic liquid in the reaction mixture usually arises from the fact that it is insoluble in one or more of the major ingredients of the foam formulation, especially the isocyanate-reactive material and/or the polyisocyanate. Solubility in these materials can be determined by conventional techniques.

The expression "inert" is to be understood as meaning that the organic liquid is chemically inert to the other ingredients of the foam formulation.

Examples of insoluble inert organic liquids include fluorinated compounds, aliphatic, cycloaliphatic or aromatic hydrocarbons.

It is preferred, however, to use as inert insoluble organic liquid a highly fluorinated or perfluorinated compound having a boiling point of at least 40° C. under normal conditions, preferably at least 60° C., more preferably about 80° C. or even above the maximum exotherm temperature of the foaming reaction.

Suitable highly fluorinated or perfluorinated compounds which may be used in the present invention include aliphatic or cycloaliphatic compounds such as alkanes or cycloalkanes which may be substituted or non substituted, cyclic or non cyclic compounds containing at least one O atom, which may be substituted or non substituted, such as fluorinated ethers, cyclic or non cyclic compounds containing at least one N atom, which may be substituted or non substituted, such as fluorinated amines, cyclic or non cyclic compounds containing O and N atoms, which may be substituted or non substituted, such as fluorinated hydroxyl amines or fluorinated amino-ethers, cyclic or non cyclic compounds containing at least one S atom, which may be substituted or non substituted, such as fluorinated sulfones, for example $CF_3SO_2CF_3$ and $CF_3SO_2CF_2CF_3$.

Particular examples of highly fluorinated or perfluorinated hydrocarbons include: perfluoronorbornadiene, perfluorodecaline, perfluorodimethylcyclohexane, perfluoromethylcyclohexane, perfluoro-1 methyldecaline, perfluorophenantrene, perfluorodimethylcyclobutane, perfluoropentane, perfluorohexane, $C_9F_{19}CHF_2$, $C_8F_{18}$, $C_7F_{16}$ and their cyclic derivatives.

Particular examples of highly fluorinated or perfluorinated oxygen containing compounds include: perfluorobutyltetrahydrofuran and perfluoropropyltetrahydrofuran.

Particular examples of highly fluorinated or perfluorinated compounds containing N atoms or N atoms and O atoms include fluorine-containing tertiary amines, for example, $(CHF_2)_3N$, $CF_3N(CHF_2)_2$, $(CF_3)_2NC_2F_5$, $CF_3N(C_2F_5)_2$, $(C_2F_5)_3N$, $(CF_3)_2NCF_2CF_2H$, $CF_3CH_2N(CH_3)_2$ and N-methyloctafluoropyrrolidine, fluorine-containing hydrazines, for example, $(CF_3)_2NN(CF_3)_2$, or $(CF_3)_2NOCH_3$, $(CF_3)_2NOC_2F_5$,

and $(CF_3)_2NOCF_2C(CF_3)FON(CF_3)FON(CF_3)_2$ and fluorine-containing amino-ethers, for example $(CF_3)_2NCF_2CF_2OCF_3$ and most preferably perfluoro-N-methylmorpholine, perfluorotripentylamine, perfluorotributylamine, perfluorotripropylamine, perfluoro-N-methylpiperidine.

Other suitable fluorinated compounds include the perfluorinated ethers commercialised by Montefluos S.p.A. as Galden HT 200, Galden HT 230, Galden HT 250 and Galden HT 270 (Galden is a trademark).

To ensure zero ozone depletion potential, it is preferred to use fluorinated compounds containing no other halogen atoms.

The inert insoluble organic liquid is used in the process of the present invention in amounts ranging from 0.05 to 5% by weight based on the total reaction system.

The substantially insoluble inert organic liquid will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants are fluoro surfactants and/or alkoxylated alkanes. Particular examples of fluoro surfactants include fluorinated alkyl polyoxyethylene ethanols, fluorinated alkyl alkoxylates and fluorinated alkyl esters.

Preferred metal salt catalysts for use in the present invention are those selected among group Ia and group IIa metal salts, more preferably among group Ia and group IIa metal carboxylates.

Particularly suitable catalysts for use in the present invention are potassium acetate and potassium ethylhexoate.

The metal salt catalyst is used in the process of the present invention in amounts ranging from 0.01 to 3% by weight based on the total reaction system.

Organic polyisocyanates which may be used in the method of the present invention include aliphatic, cycloaliphatic, araliphatic and aromatic polyisocyanates but especially the polyisocyanates proposed in literature for use in the production of foams. Of particular importance are aromatic diisocyanates such as tolylene and diphenylmethane diisocyanate in the well known pure, modified or crude forms. Special mention may be made of the socalled MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates).

The isocyanate-reactive material used in the method of the present invention preferably comprises besides the isocyanate-reactive cyclic blowing promotor and the present polyether polyol known in the art for the production of flexible poll/urethane foams also other isocyanate-reactive materials generally used in the production of rigid polyurethane foams.

Such isocyanate-reactive compounds generally used in the production of rigid polyurethane foam have a molecular weight of 62 to 1500, an equivalent molecular weight of 31 to 750 and a functionality of 2 to 8, especially 3 to 8 and include polyols, polyamines, polyimines, polyenamines and mixtures thereof.

Polymeric polyols for use in the production of rigid polyurethane foams have been fully described in the prior art and include reaction products of alkylene oxides, for example ethylene oxide and/or propylene oxide, with initiators containing from 3 to 8 active hydrogen atoms per molecule. Suitable initiators include polyols, for example, glycerol, trimethylolpropane, triethanolamine, pentaerythritol, sorbitol and sucrose, and polyamines, for example tolylene diamine, diaminodiphenylmethane and polymethylene polyphenylene polyamines, and aminoalcohols, for example, ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

Polyamines having a molecular weight below 1000 include aliphatic, cycloaliphatic or araliphatic polyamines containing two or more primary and/or secondary amino groups, such as the low molecular weight amino-ended polyethers, and aromatic polyamines such as DETDA.

In addition to the ingredients already mentioned the foam-forming mixture may contain one or more other auxiliaries or additives conventional to isocyanate-based foam formulations. Such optional additives include further conventional catalysts, fire retardants, smoke suppressants, organic or inorganic fillers, thixotropic agents, dyes, pigments, mould release agents, surfactants, foam stabilisers and the like.

Isocyanate indices of from 70 to 140 will typically be used in operating the method of the present invention but lower indices may be used if desired. Higher indices, for example 150 to 500 or even up to 3000, may be used in conjunction with trimerisation catalysts to make foams containing isocyanurate linkages.

At indices higher than 400 the open celled fine celled rigid foams of the present invention can be made by a so-called full prepolymer process wherein all of the isocyanate-reactive compounds (in this case the polyether polyol generally used in the production of flexible polyurethane foams) are reacted with the polyisocyanate in the absence of the blowing agent. This prepolymer is then subsequently used to prepare the foam by reaction of the prepolymer with the cyclic isocyanate-reactive blowing promotor, the inert insoluble organic liquid and the metal salt catalyst of the present invention and optionally other additives such as surfactants.

To reduce the number of component streams delivered to the final mixing apparatus, the cyclic isocyanate-reactive blowing promotor, the catalyst, the inert insoluble organic liquid and optionally other additives may be premixed with one of the major components of the foam formulation, in general with the isocyanate-reactive component.

Therefore the present invention also provides an isocyanate-reactive composition comprising a blowing promotor being an isocyanate-reactive cyclic compound of formula:

(I)

wherein
Y is O or NR$^1$ wherein each R$^1$ independently is a lower alkyl radical of C$_1$–C$_6$ or a lower alkyl radical substituted with an isocyanate-reactive group;
each R independently is hydrogen, a lower alkyl radical of C$_1$–C$_6$ or (CH$_2$)$_m$—X wherein X is an isocyanate-reactive group which is OH or NH$_2$ and m is 0, 1 or 2; and
n is 1 or 2;
with the proviso that at least one of R$^x$ or R is or comprises an isocyanatereactive group;

an inert insoluble organic liquid which is present as the dispersed phase of an emulsion or a microemulsion and a metal salt catalyst characterised in that said isocyanate-reactive composition further comprises a polyether polyol of average nominal functionality 2 to 6 and number average equivalent molecular weight between 1000 and 2000.

When the inert insoluble organic liquid is added to both the isocyanate-reactive component and the polyisocyanate component even finer cell sizes are obtained than when the inert insoluble organic liquid is added only to one of these components. This dual stream approach may yield cell sizes of from 30 to 70 micron while the single stream would yield cell sizes of from 50 to 90 micron for the same total amount of inert insoluble organic liquid.

The method of the present invention may be put into practice making use of conventional techniques. Thus known mixing methods may be used and the foams may be produced in the form of slabstock, mouldings, cavity fillings, sprayed foam, frothed foam or laminates with other materials such as hardboard, plasterboard, paper, plastics or metal.

Rigid polyurethane foams prepared in accordance with the method of the invention are characterised by having open cells (closed cell content below 10%) and a very fine cell structure (cell sizes smaller than 90 micron).

They are of particular use for evacuated insulation panel applications where they show superior thermal insulation properties.

Evacuated insulation panels generally comprise a low thermal conductivity filler material (such as open celled polyurethane foam) and a vessel formed of a gastight film enveloping said filler, the whole being evacuated to an internal pressure of about 5 mbar or less and then hermetically sealed.

The pressure level to which the vessel must be evacuated in order to obtain a satisfactory insulating property depends on the specific filler material. Also the extent of increase in thermal conductivity with internal pressure increase with lapse of time (owing i.e. to gases such as air and water vapor diffusing gradually) depends on the type of filler material.

Evacuated insulation panels filled with the fine celled open celled rigid polyurethane foams of the present invention are improved with respect to the necessary vacuum degree and with respect to the degradation of the thermal insulating property with lapse of time compared to evacuated insulation panels filled with the known open celled rigid polyurethane foam of the prior art due to its finer cell size.

General descriptions of the construction of evacuated insulation panels and their use in thermal devices can be found in U.S. Pat. Nos 5,066,437, 5,032,439 and 5,076,984 and European Patent Publications Nos 434266, 434225 and 181778, all incorporated herein by reference as well as the references mentioned therein.

Preferably the fine celled open celled rigid polyurethane foam of the present invention is preconditioned prior to placement in the gastight envelope. This preconditioning involves heating and agitating the filler material preferably under reduced pressure in order to remove contaminants.

To improve the performance of the evacuated insulation panel materials are provided within the sealed panels to absorb or otherwise interact with gases and vapors that remain due to imperfect evacuation, that permeate the enclosure from the outside atmosphere or evolve from the polyurethane foam filler itself. Such materials are known as getters and may include, for example, activated carbon, molecular sieves and zeolites to adsorb volatiles evolving from the polyurethane foam filler. Other suitable getter materials are described in U.S. Pat. Nos 4,000,246, 4,444,821, 4,663,551, 4,702,986 and 4,726,974 and in European Patent Publications Nos 434266 and 181778.

The insulation panels can also instead of being totally evacuated be partially or fully filled with a gas of a high thermal insulation value such as Xenon or Krypton. Loadings of 20 to 50 mbar of these gases would mask the dilution effect of air ingress into the panel over the lifetime of the panel (15 to 20 years).

The invention is illustrated but not limited by the following examples.

EXAMPLE 1

The following ingredients were used:

Daltolac XR 159 being a polyether polyol of OH value 500, molecular weight 370 and functionality 3.3 available from Imperial Chemical Industries PLC;

Polyol 1 being a polyether polyol having a functionality of 2, a OH value of 54 and a molecular weight of 2200;

Polyol 2 being a polyether polyol having a functionality of 2, a OH value of 50 to 54 and a molecular weight of 2158 (Daltocel F 452 available from Imperial Chemical Industries PLC);

Polyol 3 being a polyether polyol having a functionality of 2, a OH value of 52 and a molecular weight of 2200;

DC 193 being a silicone surfactant available from Dow Corning;

FC 430 being a fluorosurfactant available from 3M;

FC 431 being a fluorosurfactant available from 3M;

Catalyst LB being a metal salt catalyst available from Imperial Chemical Industries PLC;

Fixapret NF being a cyclic urea available from BASF; perfluoropentane available from 3M;

Suprasec DNR being a polymeric MDI available from Imperial Chemical Industries PLC.

Rigid foams of open cell, fine cell structure and good insulation property were prepared by using the following formulation (amounts are given in parts by weight):

| Polyol composition | | | | | |
| --- | --- | --- | --- | --- | --- |
| Daltolac XR 159 | 100 | 70 | 70 | 70 | 70 |
| Polyol 1 | 0 | 30 | 30 | 0 | 0 |
| Polyol 2 | 0 | 0 | 0 | 30 | 0 |
| Polyol 3 | 0 | 0 | 0 | 0 | 30 |
| DC 193 | 4 | 4 | 4 | 4 | 4 |
| FC 430 | 3 | 3 | 3 | 3 | 3 |
| Catalyst LB | 1.8 | 1.8 | 1.8 | 1.8 | 1.8 |
| Fixapret NF | 3.5 | 3.5 | 3.5 | 3.5 | 3.5 |
| perfluoropentane | 9.8 | 9.8 | 4.9 | 9.8 | 9.8 |
| Polyisocyanate composition | | | | | |
| Suprasec DNR | 134.8 | 134.8 | 134.8 | 132 | 132 |
| FC 431 | 0 | 0 | 2.0 | 0 | 0 |
| perfluoropentane | 0 | 0 | 4.9 | 0 | 0 |

The resulting rigid foams had the following properties.

| Foam | Ia | Ib | Ic | Id | Ie |
| --- | --- | --- | --- | --- | --- |
| Density (kg/m$^3$) | 43.0 | 44.2 | 46.5 | 43.8 | 44.8 |
| Closed cell content (%) | 5.2 | 7.1 | 7.2 | 7.2 | 7.5 |
| Cell size (micron) | 120 | 70 | 40 | 90 | 90 |

Density (core density) was measured according to DIN 53420 standard. Closed cell content was measured according to BS 4370 Method 10 standard and represents volume % of closed cells. Cell size was measured according to ISO 4590 standard.

EXAMPLE 2

Foam Ib prepared according to the method described in example 1 above was enveloped in a plastic bag and the whole connected to a vacuum pump. The sample was continuously pumped down and the thermal conductivity at 10° C. (lambda value in mW/m K) of the sample at different vacuum levels was measured by using a Heat Flux meter. By measuring the lambda value at different pressures a lambda versus pressure curve was obtained (see FIG. 1 which is a log diagram).

The same experiment was done with the foam Ia prepared according to the method described in example 1 above (comparative example, i.e. without the polyether polyol generally used in the production of flexible polyurethane foams).

FIG. 1 below represents the lambda versus pressure curve for foam Ib (reference: flexible polyol) and for foam Ia (reference: no flexible polyol).

These experiments show that foam Ib performs better in terms of increase in thermal conductivity with internal pressure. This means that evacuated insulation panels filled with a rigid polyurethane foam of the present invention perform satisfactory at a lower degree of vacuum and further maintain a satisfactory heat insulating property over a longer period of time (improved ageing).

EXAMPLE 3

An evacuated insulation panel was made by enveloping the open celled fine celled foam Ib prepared according to the method described in example 1, which was first preconditioned by heating and agitating under reduced pressure, by a film having a permeability of 0.02 cc/m$^2$/day and thereafter evacuating the whole to a pressure of 0.4 mbar.

Figure 2:
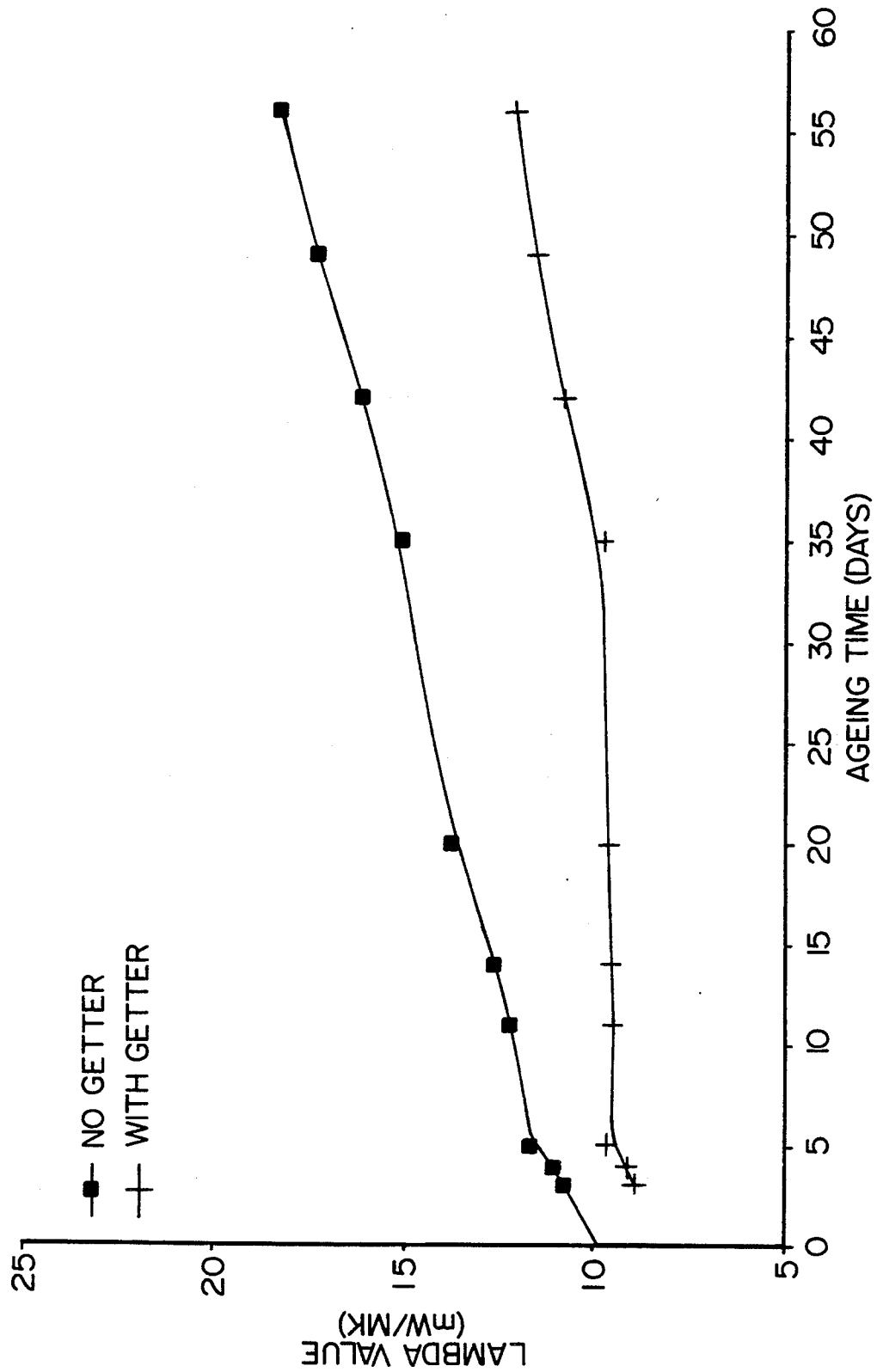
FIG. 2 shows the lambda versus time curve of the evacuated insulation panel prepared in Example 3.

The increase in lambda value with lapse of time (owing to an increase in internal pressure) of this evacuated insulation panel was measured (see FIG. 2).

The same experiment was repeated with an evacuated insulation panel filled with foam Ib and a getter (1% by weight of molecular sieve type 13 X available from Union Carbide).

As can be seen from FIG. 2 the extent of increase in internal pressure and lambda with lapse of time is much smaller for the panel containing the getter leading to improved ageing of the panel.

We claim:

1. Process for the preparation of rigid foams comprising the step of reacting an organic polyisocyanate with an isocyanate-reactive material in the presence of a blowing promotor being an isocyanate-reactive cyclic compound of formula:

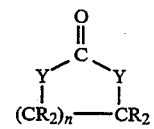

wherein

Y is O or NR$^1$ wherein each R$^1$ independently is a lower alkyl radical of C$_1$–C$_6$ or a lower alkyl radical substituted with an isocyanate-reactive group;

each R independently is hydrogen, a lower alkyl radical of C$_1$–C$_6$ or (CH$_2$)$_m$—X wherein X is an isocyanate-reactive group which is OH or NH$_2$ and m is 0, 1 or 2; and n is 1 or 2;

with the proviso that at least one of R$^1$ or R is or comprises an isocyanate-reactive group;

and in the presence of an inert insoluble organic liquid which is present as the dispersed phase of an emulsion or a microemulsion and in the presence of a metal salt catalyst characterised in that the isocyanate-reactive material comprises a polyether polyol of average nominal functionality 2 to 6 and number average equivalent molecular weight between 1000 and 2000.

2. Process according to claim 1 wherein said polyether polyol has an average nominal functionality of 2 to 4.

3. Process according to claim 1 wherein said polyether polyol has an OH value of between 20 and 80.

4. Process according to claim 1 wherein said polyether polyol is a polyoxypropylene diol or triol or a poly(oxyethylene-oxypropylene) diol or triol obtained by the simultaneous or sequential addition of ethylene and propylene oxides to di- or trifunctional initiators.

5. Process according to claim 4 wherein said di- or trifunctional initiators are selected from the group comprising ethylene glycol, diethylene glycol, dipropylene glycol and glycerol.

6. Process according to claim 1 wherein the polyether polyol is used in amounts ranging from 2 to 40% by weight based on the total isocyanate-reactive components.

7. Process according to claim 1 wherein the isocyanate-reactive cyclic blowing promotor is glycerol carbonate.

8. Process according claim 1 wherein the isocyanate-reactive cyclic blowing promotor is a cyclic urea of formula

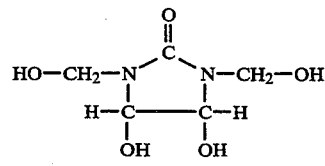

or

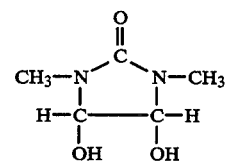

9. Process according to claim 1 wherein the isocyanate-reactive cyclic blowing promotor is used in amounts ranging from 1 to 99% by weight based on the total isocyanate-reactive material.

10. Process according to claim 1 wherein the inert insoluble organic liquid is a highly fluorinated or perfluorinated compound having a boiling point of at least 40° C.

11. Process according to claim 10 wherein the inert insoluble organic liquid is perfluoropentane.

12. Process according to claim 1 wherein the inert insoluble organic liquid is added in amounts ranging from 0.05 to 5% by weight based on the total reaction system.

13. Process according to any one of the preceding claims wherein the metal salt catalyst is a group Ia or group IIa metal carboxylate.

14. Process according to claim 1 wherein the metal salt catalyst is added in amounts ranging from 0.01 to 3% by weight based on the total reaction system.

15. Process according to claim 1 wherein the isocyanateo-reactive material further comprises isocyanate-reactive materials generally used in the production of rigid polyurethane foams.

16. Isocyanate-reactive composition comprising a blowing promotor being an isocyanate-reactive cyclic compound of formula:

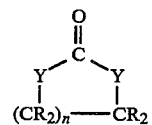

wherein
Y is O or NR$^1$ wherein each R$^1$ independently is a lower alkyl radical of C$_1$-C$_6$ or a lower alkyl radical substituted with an isocyanate-reactive group;
each R independently is hydrogen, a lower alkyl radical of C$_1$-C$_6$ or (CH$_2$)$_m$—X wherein X is an isocyanate-reactive group which is OH or NH$_2$ and m is 0, 1 or 2; and
n is 1 or 2;
with the proviso that at least one of R$^1$ or R is or comprises an isocyanate-reactive group;
an inert insoluble organic liquid which is present as the dispersed phase of an emulsion or a microemulsion and a metal salt catalyst characterised in that said isocyanate-reactive composition further comprises a polyether polyol of average nominal functionality 2 to 6 and number average equivalent molecular weight between 1000 and 2000.

17. Rigid open celled polyurethane foam obtainable by the process as defined in claim 1.

18. Evacuated insulation panel comprising a filler material and a vessel formed of a gastight film enveloping said filler characterised in that said filler material comprises a rigid open celled polyurethane foam as defined in claim 17.

19. Evacuated insulation panel according to claim 18 wherein said panel also comprises a getter.

20. Evacuated insulation panel according to claim 19 wherein said getter comprises a molecular sieve.

* * * * *